(12) United States Patent
Lai

(10) Patent No.: US 11,788,700 B1
(45) Date of Patent: Oct. 17, 2023

(54) ADJUSTABLE LIGHT FIXTURE CAPABLE OF PREVENTING LIGHT HOLDER FROM FALLING OFF

(71) Applicant: EAGLE EYES TRAFFIC INDUSTRIAL CO., LTD., Tainan (TW)

(72) Inventor: Ching-Tsung Lai, Tainan (TW)

(73) Assignee: Eagle Eyes Traffic Industrial Co., Ltd., Tainan (TW)

( * ) Notice: Subject to any disclaimer, the term of this patent is extended or adjusted under 35 U.S.C. 154(b) by 0 days.

(21) Appl. No.: 17/934,652

(22) Filed: Sep. 23, 2022

(51) Int. Cl.
*F21S 41/19* (2018.01)

(52) U.S. Cl.
CPC ..................... *F21S 41/19* (2018.01)

(58) Field of Classification Search
CPC .......... B60Q 1/045; B60Q 1/06; B60Q 1/068; B60Q 1/0683; F21S 41/19; F21S 41/192
See application file for complete search history.

(56) References Cited

U.S. PATENT DOCUMENTS

| | | | | |
|---|---|---|---|---|
| 4,967,318 | A * | 10/1990 | Ewert | F21S 41/675 |
| | | | | 362/427 |
| 7,207,704 | B2 * | 4/2007 | Tachiiwa | B60Q 1/0683 |
| | | | | 362/512 |
| 7,784,955 | B2 | 8/2010 | Choi et al. | |
| 2002/0044440 | A1 * | 4/2002 | Chiang | B60Q 1/0683 |
| | | | | 362/37 |
| 2002/0085385 | A1 * | 7/2002 | Shirai | B60Q 1/0683 |
| | | | | 362/523 |
| 2002/0085386 | A1 * | 7/2002 | Shirai | F21S 43/50 |
| | | | | 362/284 |
| 2002/0170609 | A1 | 11/2002 | Herinckx | |
| 2003/0117810 | A1 * | 6/2003 | Nakazawa | B60Q 1/0683 |
| | | | | 362/273 |
| 2004/0090792 | A1 * | 5/2004 | Burton | B60Q 1/0683 |
| | | | | 362/284 |
| 2007/0127254 | A1 * | 6/2007 | Chen | B60Q 1/0683 |
| | | | | 362/512 |
| 2008/0225546 | A1 * | 9/2008 | Lin | B60Q 1/0683 |
| | | | | 362/267 |
| 2014/0268843 | A1 * | 9/2014 | Ruprecht | B60Q 1/0683 |
| | | | | 362/487 |
| 2017/0043706 | A1 * | 2/2017 | Shibata | B60Q 1/0433 |
| 2017/0097137 | A1 * | 4/2017 | Shibata | F21S 41/663 |
| 2017/0151901 | A1 * | 6/2017 | Sazuka | F21S 45/47 |
| 2018/0163941 | A1 * | 6/2018 | Lee | B60Q 1/007 |

FOREIGN PATENT DOCUMENTS

| | | | |
|---|---|---|---|
| EP | 3441261 B1 | 2/2020 | |
| WO | WO 2021/209021 | * 10/2021 | |

* cited by examiner

*Primary Examiner* — Zheng Song
(74) *Attorney, Agent, or Firm* — Rosenberg, Klein & Lee

(57) ABSTRACT

An adjustable light fixture includes a light holder pivotally connected to a mounting base, an adjustment unit, and an anti-falling member. The light holder has a pivot portion and an opening. The adjustment unit drives the light holder to pivot relative to the mounting base via the pivot portion. The anti-falling member has a first elastic rod and a second elastic rod. The first elastic rod is connected to the light holder. One end of the second elastic rod is fixed to the mounting base, and the other end of the second elastic rod is fixed to the first elastic rod, thereby preventing the light holder from being separated from the mounting base effectively.

6 Claims, 19 Drawing Sheets

ADJUSTABLE LIGHT FIXTURE CAPABLE OF PREVENTING LIGHT HOLDER FROM FALLING OFF

FIELD OF THE INVENTION

The present invention relates to an adjustable light fixture, and more particularly to an adjustable light fixture capable of preventing a light holder from falling off. The adjustable light fixture comprises a mounting base, a light holder, an adjustment unit, and an anti-falling member. When the adjustment unit drives the light holder to pivot relative to the mounting base via a pivot portion of the light holder, the light holder won't be separated from the mounting base through the anti-falling member connecting the mounting base and the light holder.

BACKGROUND OF THE INVENTION

Lighting has been one of the most indispensable needs of human beings. Especially, when riding or driving any vehicle, it is necessary to have the lighting of vehicle lights on the way for a better line of sight. Even in the daytime, when driving in a tunnel or on a cloudy and rainy day, the driver will turn on the lights to insure traffic safety. If driving at night, the driver needs to see the surrounding scenery through the vehicle lights. Therefore, the light fixtures of a vehicle are an indispensable and important accessory.

Headlights can be switched to provide high beams or low beams, which can be used according to different driving conditions. In addition to the lighting function, the headlight can achieve a warning effect by switching the high beams and the low beams in a short time. When encountering different situations, different irradiation angles of the headlight will be required to meet the needs of the current situation. Therefore, how to develop a structure that can adjust the irradiation angle of a headlight will be a major challenge.

U.S. patent publication No. U.S. Pat. No. 7,784,955B2 discloses an alignment device for headlights, comprising a mounting bracket, a low beam unit and a high beam unit. The low beam unit includes a plurality of lighting units arranged in a row. The low beam unit is disposed on the mounting bracket. The high beam unit is connected to the low beam unit. The mounting bracket is pivotally connected to a support plate of a vehicle body through a pivot unit. A vertical alignment unit and a horizontal alignment unit are connected between the mounting bracket and the support plate. The vertical alignment unit drives the mounting bracket to pivot in the vertical direction relative to the support plate, and the horizontal alignment unit drives the mounting bracket to pivot in the horizontal direction relative to the support plate, thereby changing the irradiation angles of the low beam unit and the high beam unit.

European Patent Publication No. EP3441261B1 discloses a vehicle lighting device equipped with a rotating module, comprising a housing and a plurality of lighting modules. The plurality of lighting modules are pivotally connected to the housing and located in an accommodating space of the housing. A manual adjustment device is connected between the housing and each of the plurality of lighting modules. Each manual adjustment device can drive each of the plurality of lighting modules to pivot relative to the housing about an axis, thereby changing an irradiation angle of the plurality of lighting modules.

U.S. Patent Application Publication No. US20220170609A1 discloses a vehicle light device, comprising a housing module, and first and second beam pattern modules. The first beam pattern module is equipped with a plurality of first LED lights. The first beam pattern module is pivotally connected to the light housing through a first rotating unit. A first adjustment module is connected between the first beam pattern module and the light housing. The second beam pattern module is equipped with a plurality of second LED lights. The second beam pattern module is pivotally connected to the light housing through a second rotating unit. A second adjustment module is connected between the second beam pattern module and the light housing. Thus, the first adjustment module drives the first beam pattern module to pivot relative to the light housing, so as to adjust the irradiation angle of the first beam pattern module. The second adjustment module drives the second beam pattern module to pivot relative to the light housing, so as to adjust the irradiation angle of the second beam pattern module.

In the above-mentioned inventions, the lights can be adjusted to different irradiation angles. However, the pivot point of the light is the most likely area to cause loosening. When a vehicle runs on a bumpy road, the vehicle light may be separated from the vehicle body. For example, due to the shaking of the vehicle body, the light is loosened from the pivot shaft.

SUMMARY OF THE INVENTION

The primary object of the present invention is to provide an adjustable light fixture capable of preventing a light holder from falling off. The adjustable light fixture can prevent a vehicle light from separating from a vehicle body while keeping the adjustable angle of the vehicle light.

The adjustable light fixture comprises a mounting base, a light holder, an adjustment unit, and an anti-falling member. The mounting base has a mounting space. The light holder has a pivot portion and an opening. The opening passes through the light holder. The light holder is pivotally connected to the mounting base through the pivot portion and is located in the mounting space. The light holder is equipped with at least one light-emitting unit. The adjustment unit is connected to the light holder. The adjustment unit drives the light holder to pivot relative to the mounting base via the pivot portion. The anti-falling member is made of an elastic material. The anti-falling member connects the mounting base and the light holder. The anti-falling member has a first elastic rod and a second elastic rod. The light holder has an outer side and an inner side. Two opposite ends of the first elastic rod are movably inserted into two opposite positioning grooves of the light holder, respectively. The two positioning grooves are located at the outer side. One end of the second elastic rod is fixed in a fixing hole of the mounting base. Another end of the second elastic rod is fixed to a middle section of the first elastic rod. The middle section of the first elastic rod has a concave portion. The second elastic rod passes through the opening from the inner side and is fixed to the concave portion at the outer side.

In one embodiment of the present invention, the anti-falling member is an elastic rod. Two opposite ends of the elastic rod are movably inserted into the two opposite positioning grooves of the light holder, respectively. A middle section of the elastic rod has a concave portion. The concave portion passes through the opening from the outer side and is fixed to the mounting base at the inner side.

Preferably, the pivot portion of the light holder is pivotally connected to the mounting base through a ball joint. The ball joint has a fixed end and a rotating end. The fixed end is fixed to the mounting base. The rotating end is disposed on the pivot portion of the light holder.

Preferably, the adjustment unit includes a screw rod and a nut. One end of the screw rod is rotatably inserted through the mounting base. Another end of the screw rod is screwed to the nut. The nut is insertedly connected to an adjustment hole of the light holder. Two opposite surfaces of the adjustment hole are defined as a first contact surface and a second contact surface, respectively. The nut has a first engaging portion and a second engaging portion. The first engaging portion is engaged with the first contact surface. The second engaging portion is engaged with the second contact surface.

Preferably, the light holder has a plurality of light holes, the light holes are arranged in a linear manner, and each light hole is equipped with the light-emitting unit.

Alternatively, the light holder has a plurality of light holes, the light holes are arranged in a non-linear manner, and each light hole is equipped with the light-emitting unit.

Preferably, one end of the anti-falling member, connected to the light holder, is located at a same height as the pivot portion According to the above technical features, the present invention can achieve the following effects:

1. One end of the anti-falling member made of an elastic material is connected to the light holder, and the other end of the anti-falling member is connected to the mounting base. In this way, on the premise that the adjustment unit can drive the light holder to pivot relative to the mounting base via the pivot portion, the effect of preventing the light holder from being disengaged from the mounting base can be achieved.

2. The anti-falling member is connected to the outer side of the light holder and passes through the opening of the light holder to be connected to the mounting base at the inner side of the light holder. In this way, it is possible to apply a force from the outer side of the light holder to hold the light holder from the outer side to the inner side effectively and prevent the light holder from being detached from the mounting base.

3. The anti-falling member has a first elastic rod and a second elastic rod. Two opposite ends of the first elastic rod are inserted into two opposite positioning grooves of the light holder, respectively. One end of the second elastic rod is fixed to the mounting base, and the other end of the second elastic rod passes through the opening from the inner side and is fixed to a middle section of the first elastic rod at the outer side. The convenience of assembly is improved.

4. The concave portion of the first elastic rod keeps the second elastic rod in position effectively to prevent the second elastic rod from sliding on the first elastic rod, thereby reducing the wear between components effectively.

5. The adjustable light fixture of the present invention can provide different assembling methods through different types of anti-falling members, so that the user can select an appropriate anti-falling member according to different assembly requirements.

6. In the prior art, the light holder is easy to loosen at the position of the pivot portion. The end of the anti-falling member, connected to the light holder, is located at the same height as the pivot portion, so it can prevent the light holder from being separated from the mounting base effectively.

7. The fixed end of the ball joint is fixed to the mounting base, and the rotating end of the ball joint is connected to the pivot portion of the light holder, so that the light holder can pivot relative to the mounting base at the pivot portion through the ball joint.

8. The adjustment unit is composed of a screw rod and a nut. One end of the screw rod is fixed to the mounting base, and the other end is screwed to the nut. When the screw rod drives the light holder to pivot, the first engaging portion of the nut is engaged with the first contact surface of the adjustment hole to drive the light holder to pivot, or the second engaging portion of the nut is engaged with the second contact surface of the adjustment hole to drive the light holder to pivot, thereby driving the light holder to pivot relative to the mounting base through the adjustment unit effectively.

9. The plurality of light holes of the light holder can be arranged in a linear manner or in a non-linear manner, so the plurality of light-emitting units can be mounted to the light holder in a linear manner or in a non-linear manner according to the needs of use.

DESCRIPTION OF THE PREFERRED EMBODIMENTS

Figure 1:
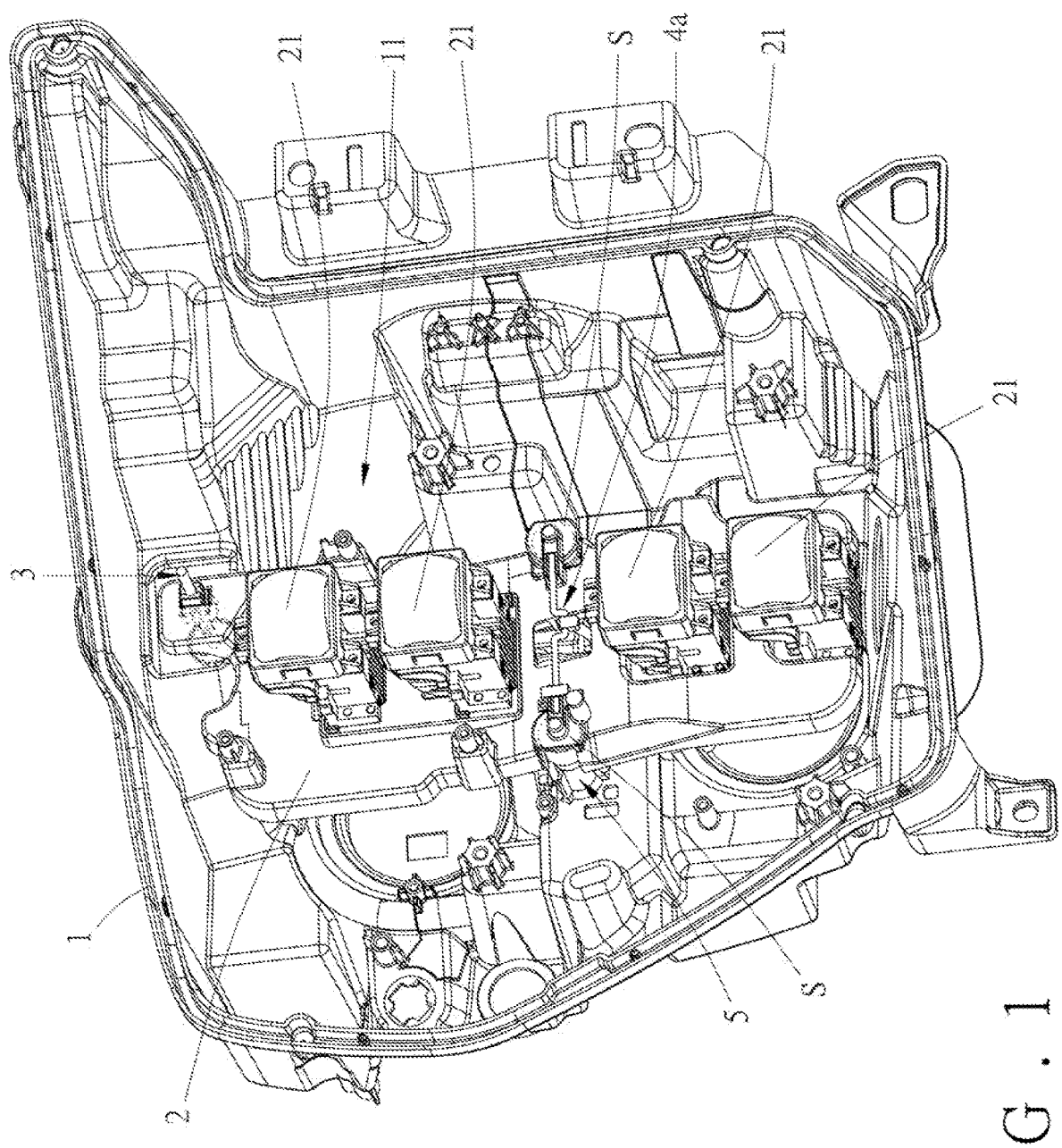
FIG. 1 is a perspective view of the adjustable light fixture according to a first embodiment of the present invention.
Figure 2:
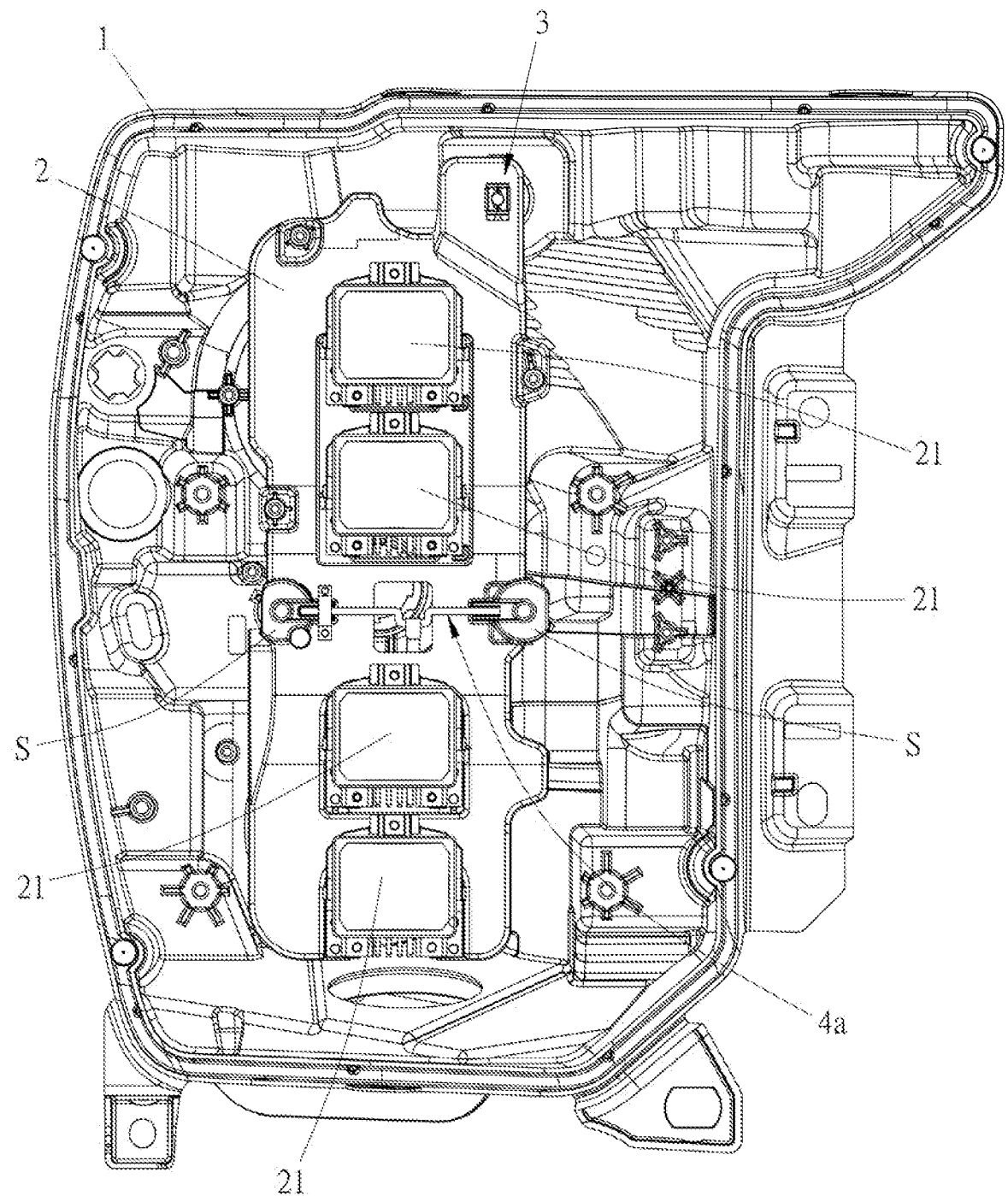
FIG. 2 is a front view of FIG. 1.
Figure 3:
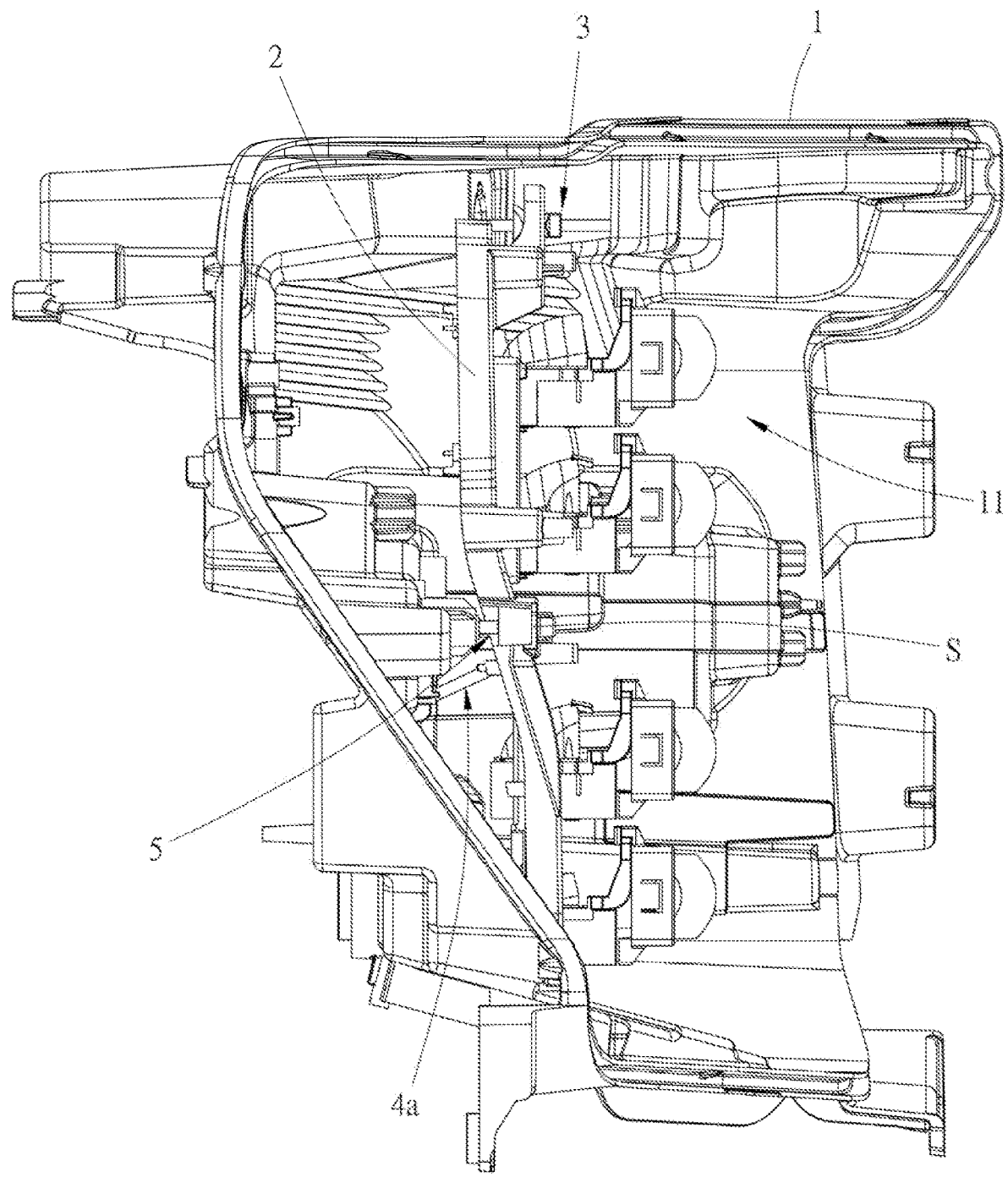
FIG. 3 is a side view of FIG. 1.
Figure 4:
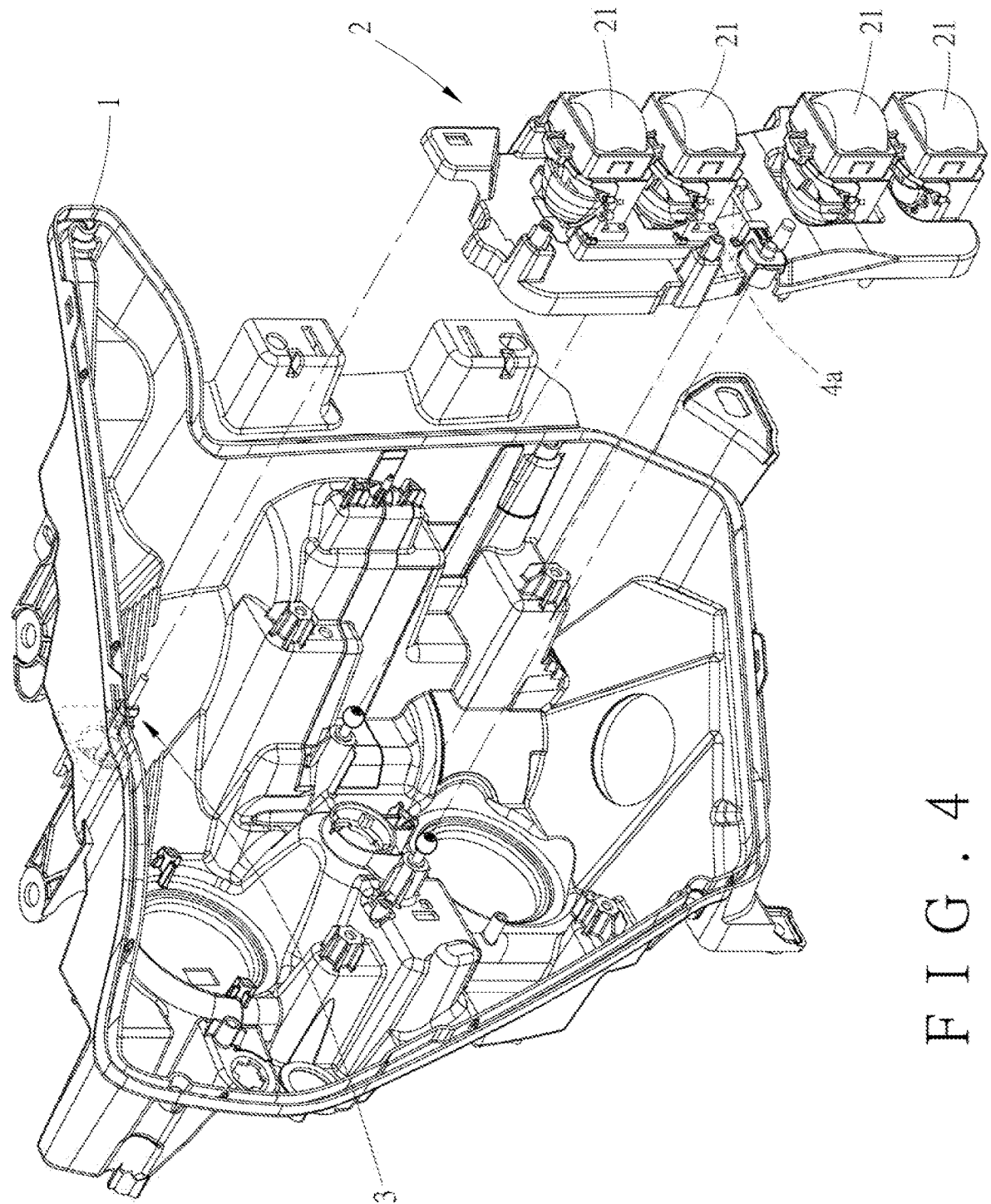
FIG. 4 is an exploded view of the mounting base and the light holder according to the first embodiment of the present invention.

Embodiments of the present invention will now be described, by way of example only, with reference to the accompanying drawings.

Referring to FIGS. 1 to 4, an adjustable light fixture capable of preventing a light holder from falling off according to a first embodiment of the present invention comprises a mounting base 1, a light holder 2, an adjustment unit 3, and an anti-falling member 4a. The mounting base 1 has a mounting space 11. Two opposite sides of the light holder 2 each have a pivot portion S. The light bolder 2 is pivotally connected to the mounting base 1 and is located in the mounting space 11 through a ball joint 5 disposed on the two pivot portions S. The light holder 2 is equipped with at least one light-emitting unit 21. In this embodiment, four light-emitting units 21 are mounted to the light holder 2, but not limited to this. The adjustment unit 3 is connected to the light holder 2. The adjustment unit 3 drives the light holder 2 to pivot relative to the mounting base 1 via the pivot portion S to make the light-emitting unit 21 change the irradiation angle. The anti-falling member 4a made of an elastic material connects the mounting base 1 and the light holder 2. One end of the anti-falling member 4a is connected to the light holder 2, and the other end is connected to the mounting base 1. In this way, on the premise that the adjustment unit 3 can drive the light holder 2 to pivot relative to the mounting base 1 via the pivot portion S, the effect of preventing the light holder 2 and the mounting base 1 from being swayed and disengaged due to the vehicle running on a bumpy road is achieved.

Figure 5:
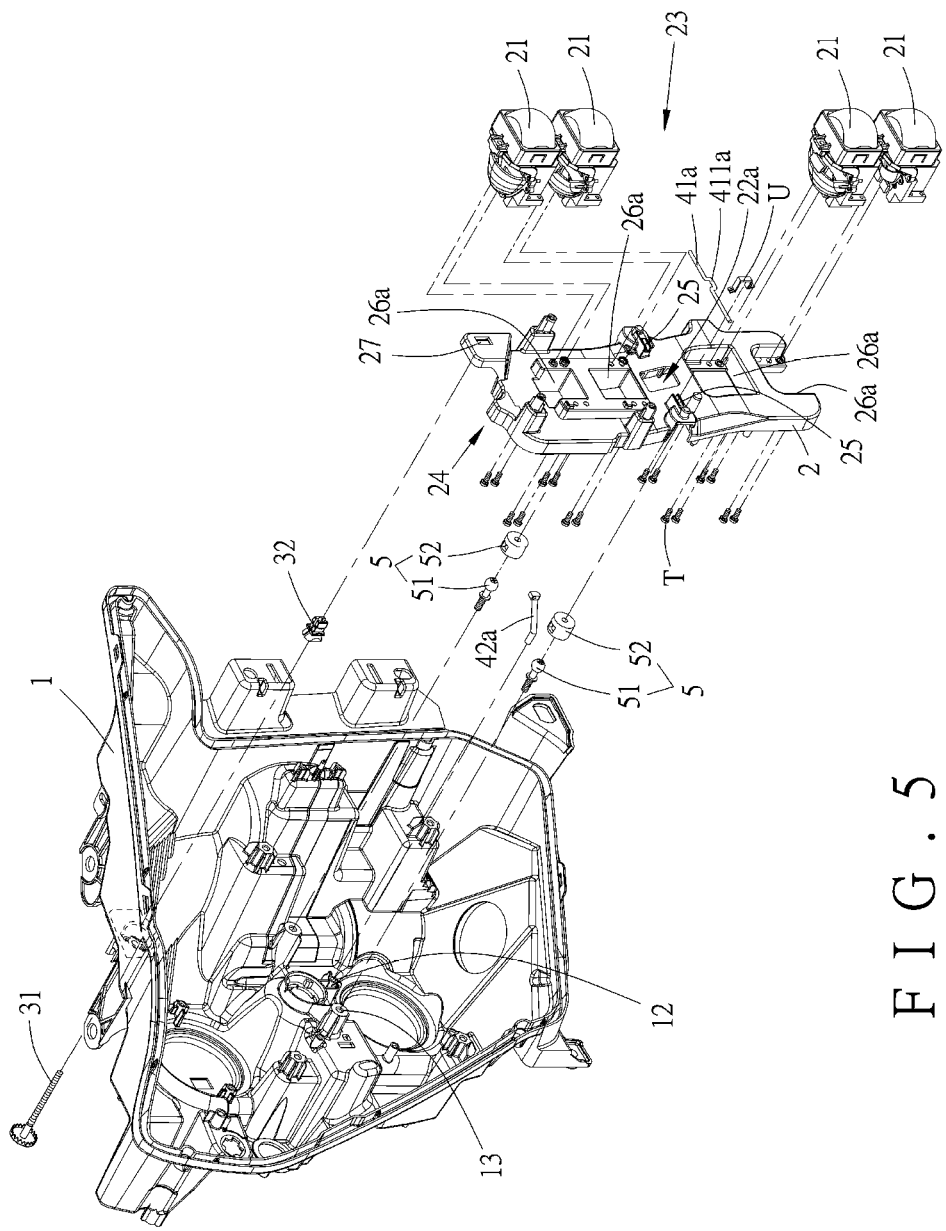
FIG. 5 is an exploded view of the adjustable light fixture according to the first embodiment of the present invention.

Please refer to FIG. 5. The light holder 2 has an opening 22a. The opening 22a passes through the light holder 2. The light holder 2 has an outer side 23 and an inner side 24. The anti-falling member 4a has a first elastic rod 41a and a second elastic rod 42a. Two opposite ends of the first elastic rod 41a are movably inserted into two opposite positioning grooves 25 of the light holder 2, respectively. A restricting member U is disposed in one of the positioning grooves 25 to restrict the first elastic rod 41a. One end of the second elastic rod 42a is fixed in a fixing hole 12 of the mounting base 1, and the other end of the second elastic rod 42a passes through the opening 22a from the inner side 24 and is fixed to a concave portion 411a of a middle section of the first elastic rod 41a at the outer side 23. In this way, it is possible to apply a force from the outer side 23 of the light holder 2 to effectively hold the light holder 2 from the outer side 23 to the inner side 24 and prevent the light holder 2 from being detached from the mounting base 1. Besides, the convenience of assembly is improved. The concave portion 411a keeps the second elastic rod 42a in position effectively to prevent the second elastic rod 42a from sliding on the first elastic rod 41a, thereby reducing the wear between components effectively. In addition, since the light holder 2 is prone to loosening at the position of the pivot portion S, the end of the anti-falling member 4a, connected to the light holder 2, is located at the same height as the pivot portion S, so it can prevent the light holder 2 from being separated from the mounting base 1 effectively. The anti-falling member 4a and the pivot portion S are located at the same height position, which can reduce the amount of deformation of the anti-falling member 4a when the light holder 2 changes the irradiation angle. The service life of the anti-falling member 4a can be prolonged to keep the anti-falling effect.

In this embodiment, the light holder 2 has four light holes 26a. The four light holes 26a are arranged in a linear manner. Each light hole 26a is equipped with the light-emitting unit 21. The light-emitting unit 21 is connected to the light hole 26a by a plurality of screws T. In this way, the light-emitting units 21 can be mounted to the light holder 2 in a linear arrangement according to the usage requirements.

Figure 6:
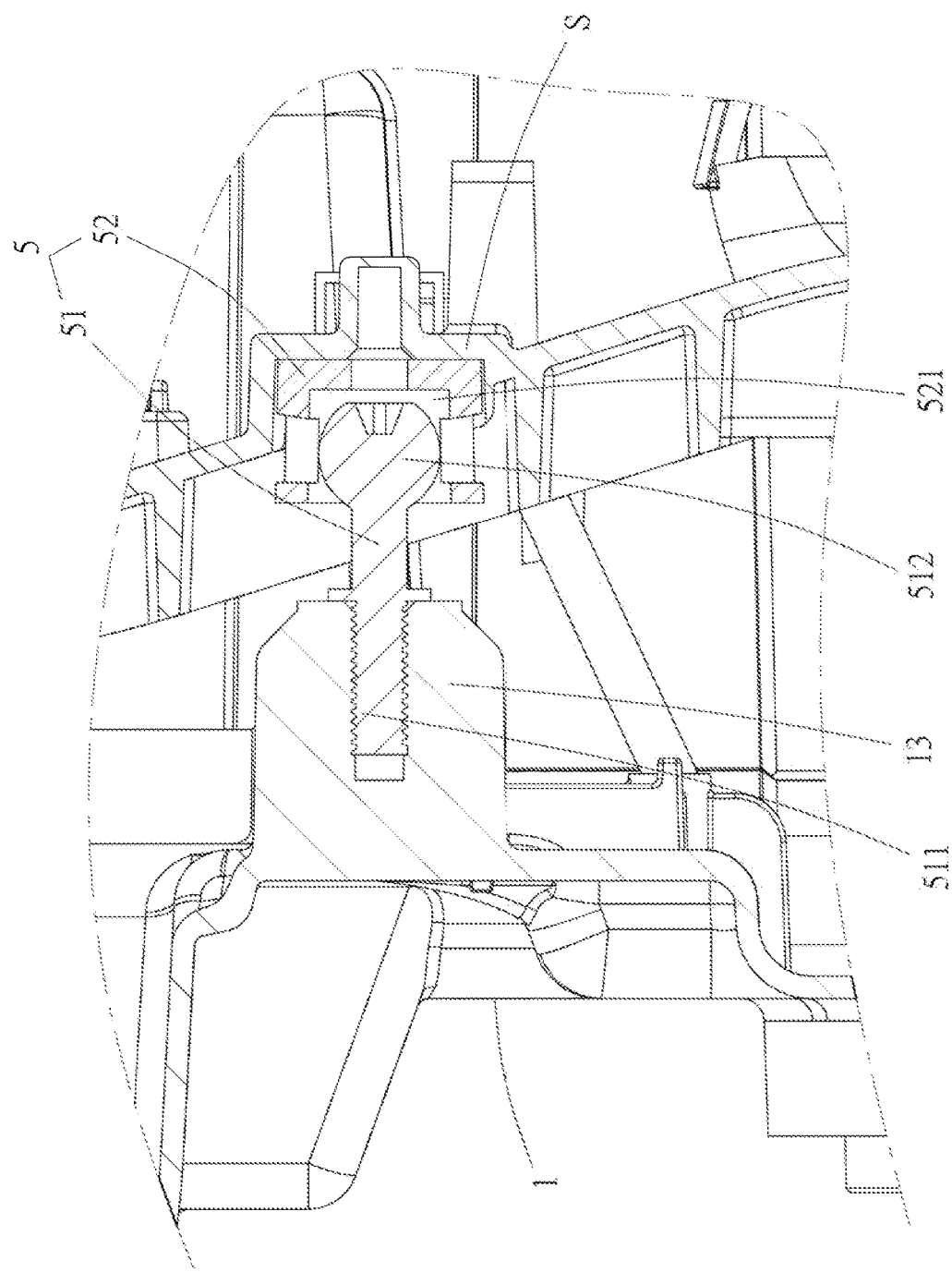
FIG. 6 is a lateral cross-sectional view of the ball joint, illustrating the pivotal relationship between the mounting base and the light holder.

Please refer to FIG. 5 and FIG. 6. In this embodiment, two ball joints 5 are provided. The two ball joints 5 correspond to the pivot portions S of the light holder 2, respectively. Each ball joint 5 includes a ball head screw 51 and a ball head cover 52. The ball head screw 51 has a fixed end 511 and a rotating end 512. The fixed end 511 has threads and is screwedly connected to a screw hole 13 of the mounting base 1. The rotating end 512 is rotatably connected to the ball head cover 52 and is located in a cover space 521. The ball head cover 52 is fixed to the pivot portion S of the light holder 2, so that the light holder 2 can pivot relative to the mounting base 1 at the pivot portion S through the ball joint 5.

Figure 7:
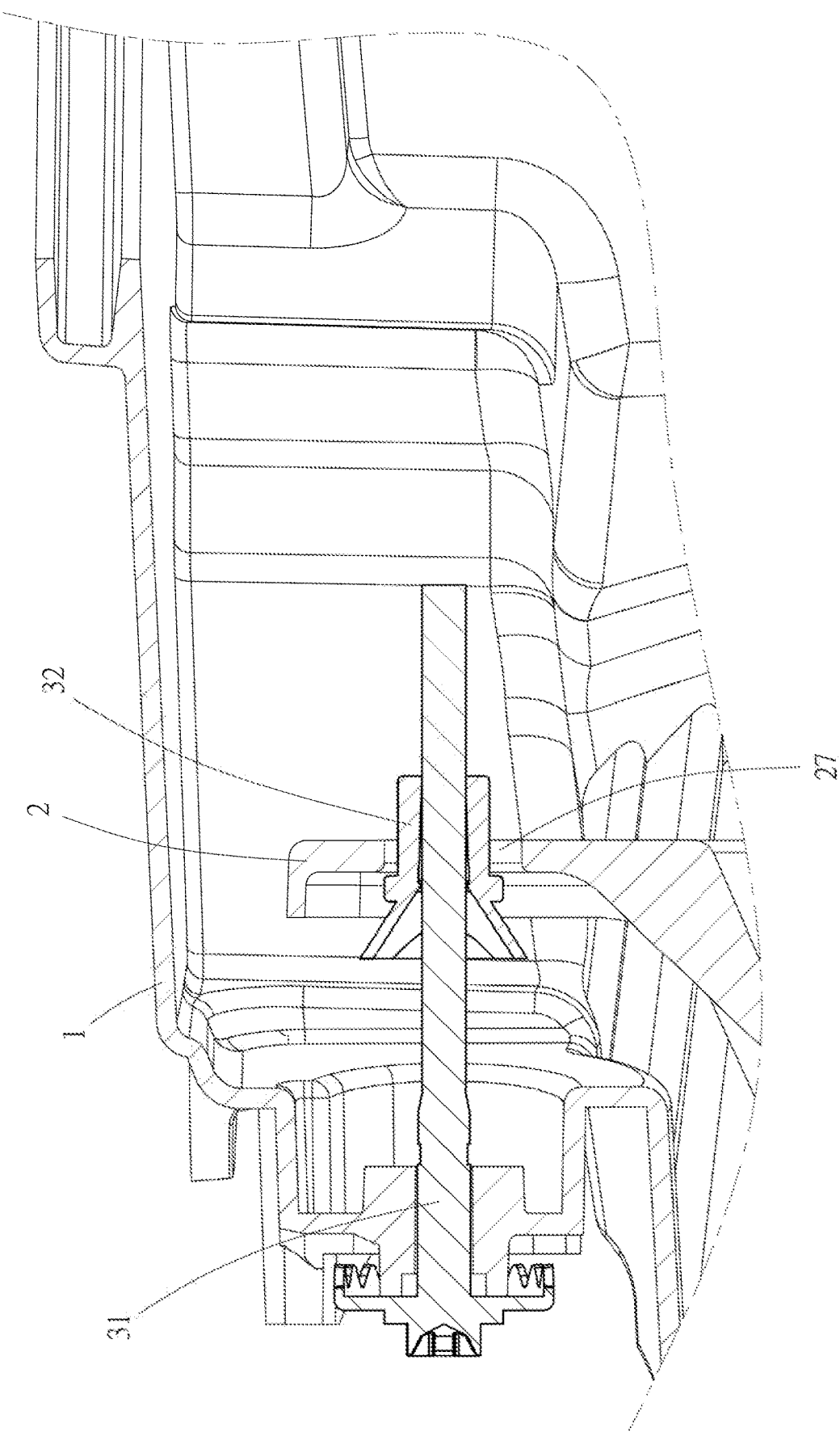
FIG. 7 is a lateral cross-sectional view of the adjustment unit, illustrating the connection relationship between the adjustment unit, the mounting base and the light holder.
Figure 8:
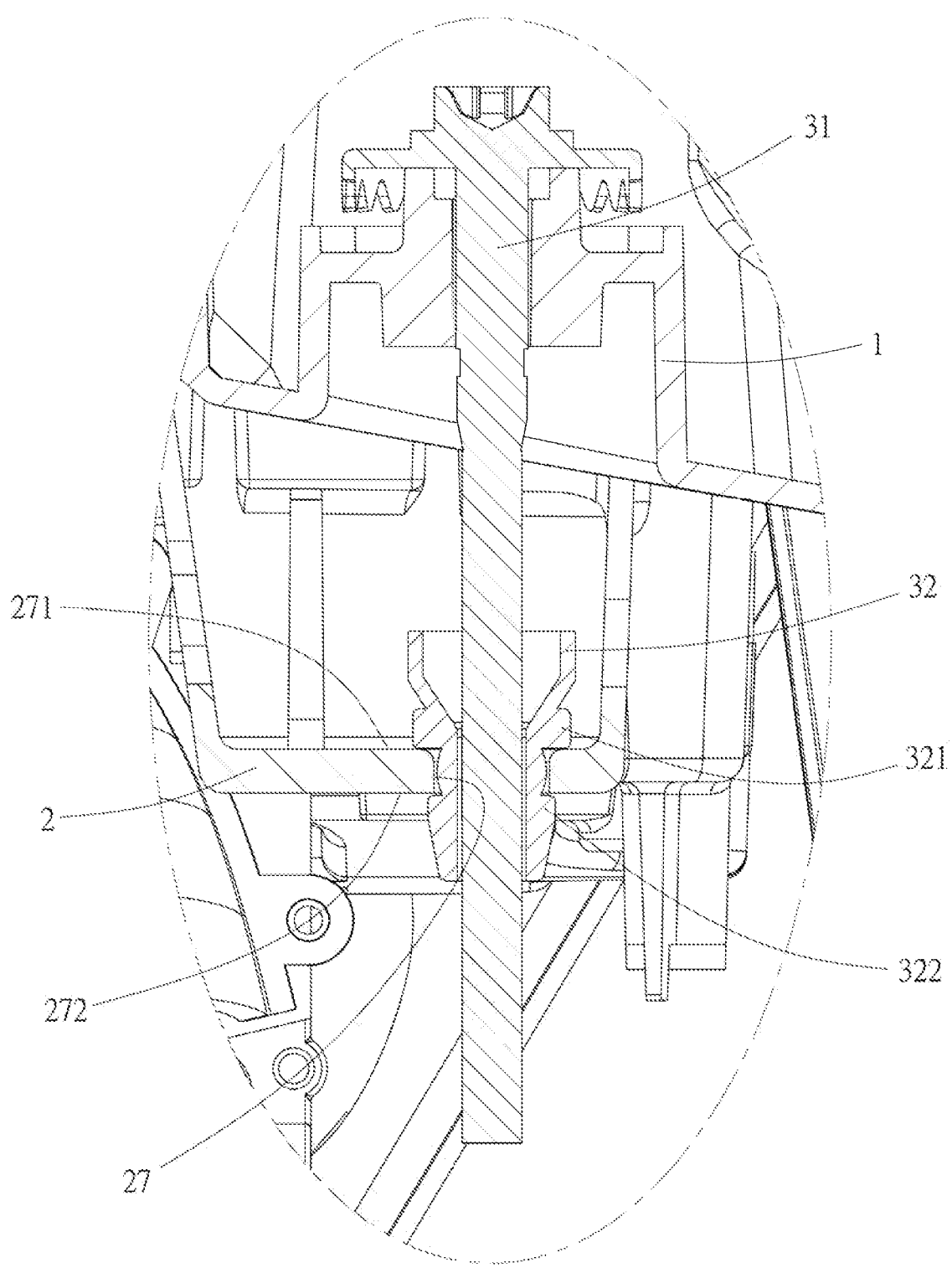
FIG. 8 is a top cross-sectional view of the adjustment unit, illustrating the connection relationship between the adjustment unit, the mounting base and the light holder.
Figure 9:
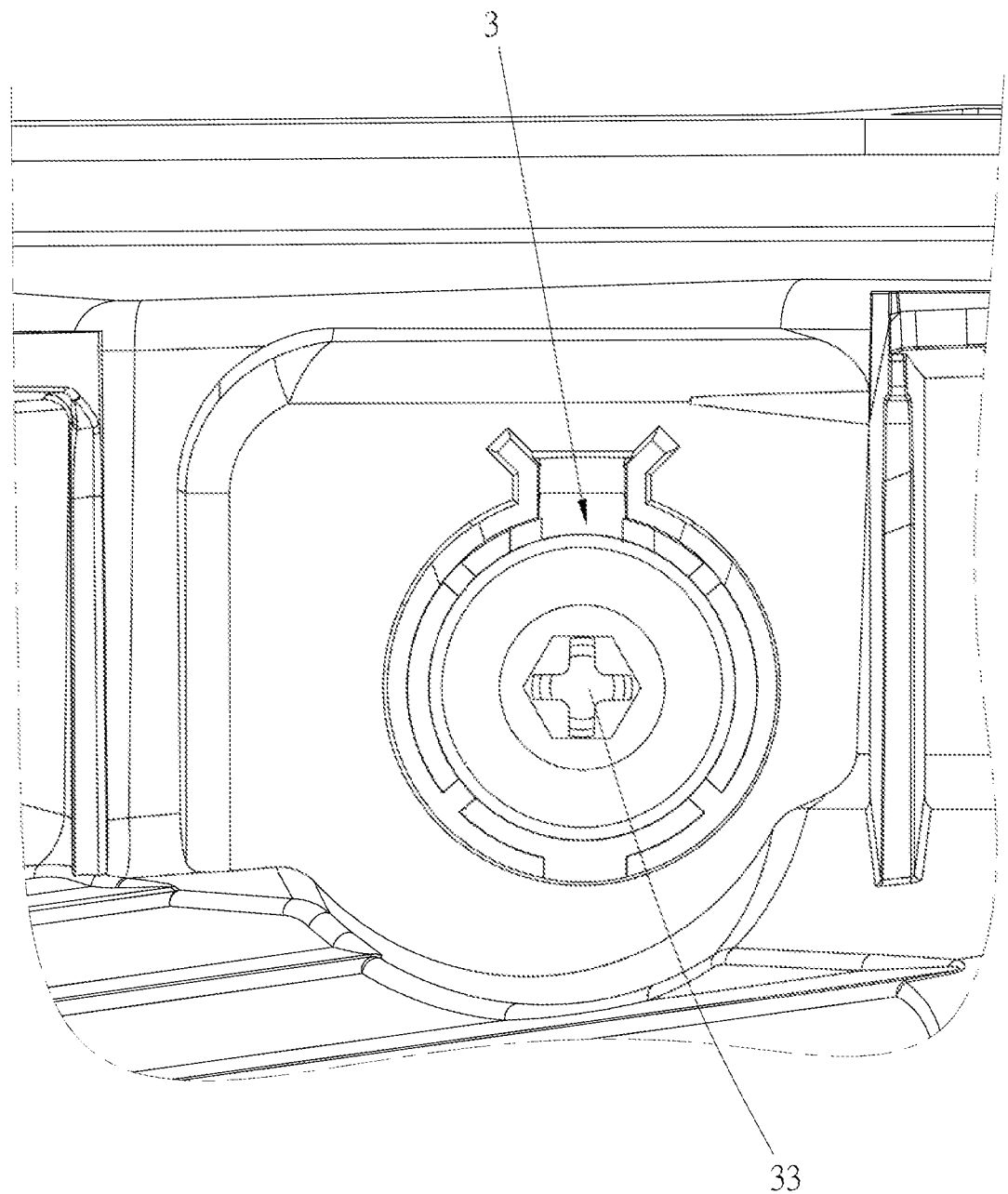
FIG. 9 is a rear view of the adjustment unit, illustrating the drive portion of the adjustment unit.
Figure 10:
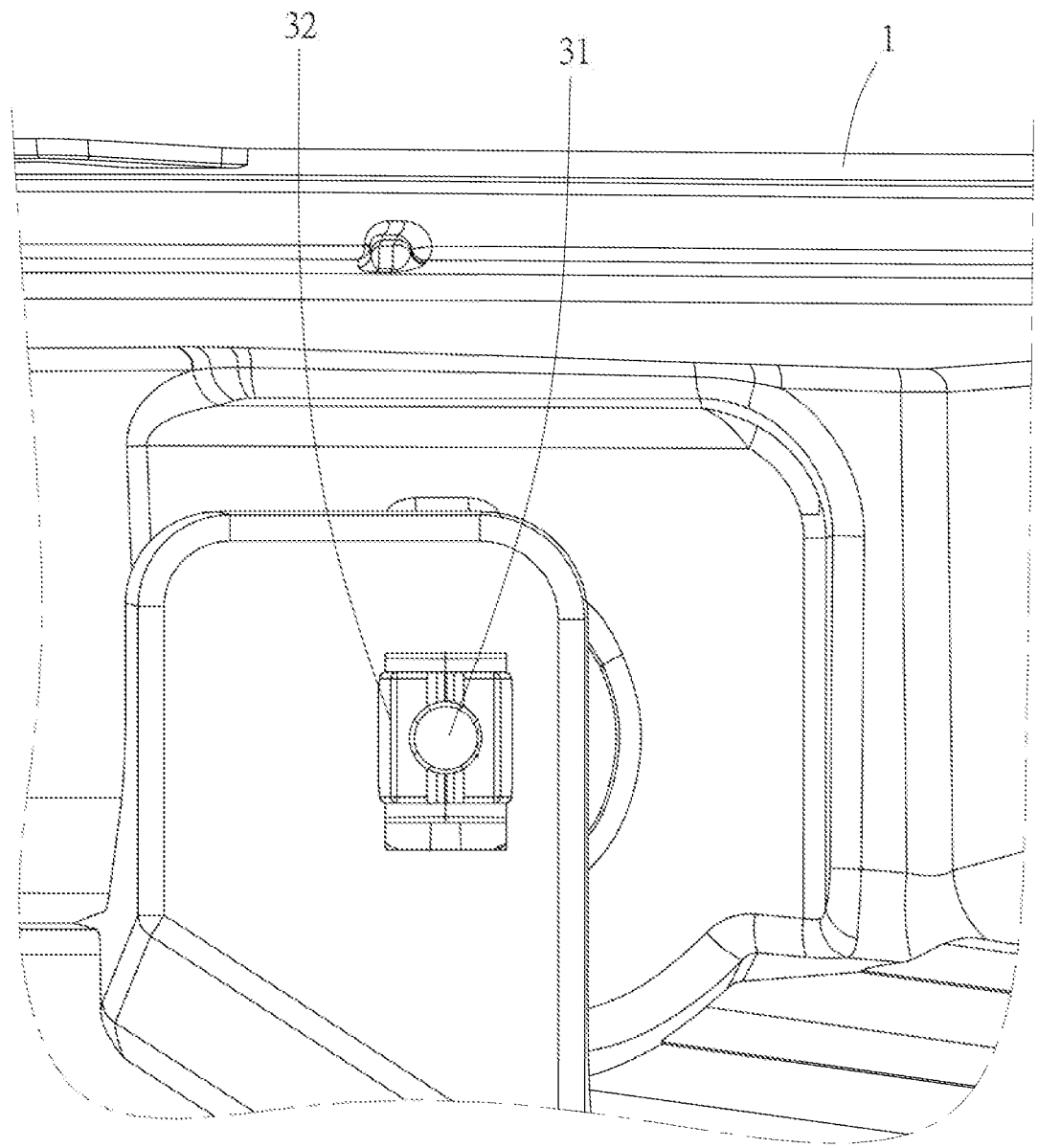
FIG. 10 is a front view of the adjustment unit, illustrating the screwing relationship between the screw rod and the nut.

Please refer to FIG. 5, FIG. 7 and FIG. 8. The adjustment unit 3 includes a screw rod 31 and a nut 32. One end of the screw rod 31 is rotatably inserted through the mounting base 1, and the other end of the screw rod 31 is screwed to the nut 32. The nut 32 is insertedly connected to an adjustment hole 27 of the light holder 2. Two opposite surfaces of the adjustment hole 27 are defined as a first contact surface 271 and a second contact surface 272, respectively. The nut 32 has a first engaging portion 321 and a second engaging portion 322. The first engaging portion 321 is engaged with the first contact surface 271, and the second engaging portion 322 is engaged with the second contact surface 272. Referring to FIG. 9 and FIG. 10, when a drive portion 33 of the adjustment unit 3 drives the screw rod 31 to rotate, the screw rod 31 will screw and drive the nut 32 to move in a direction away from or close to the mounting base 1.

Figure 11:
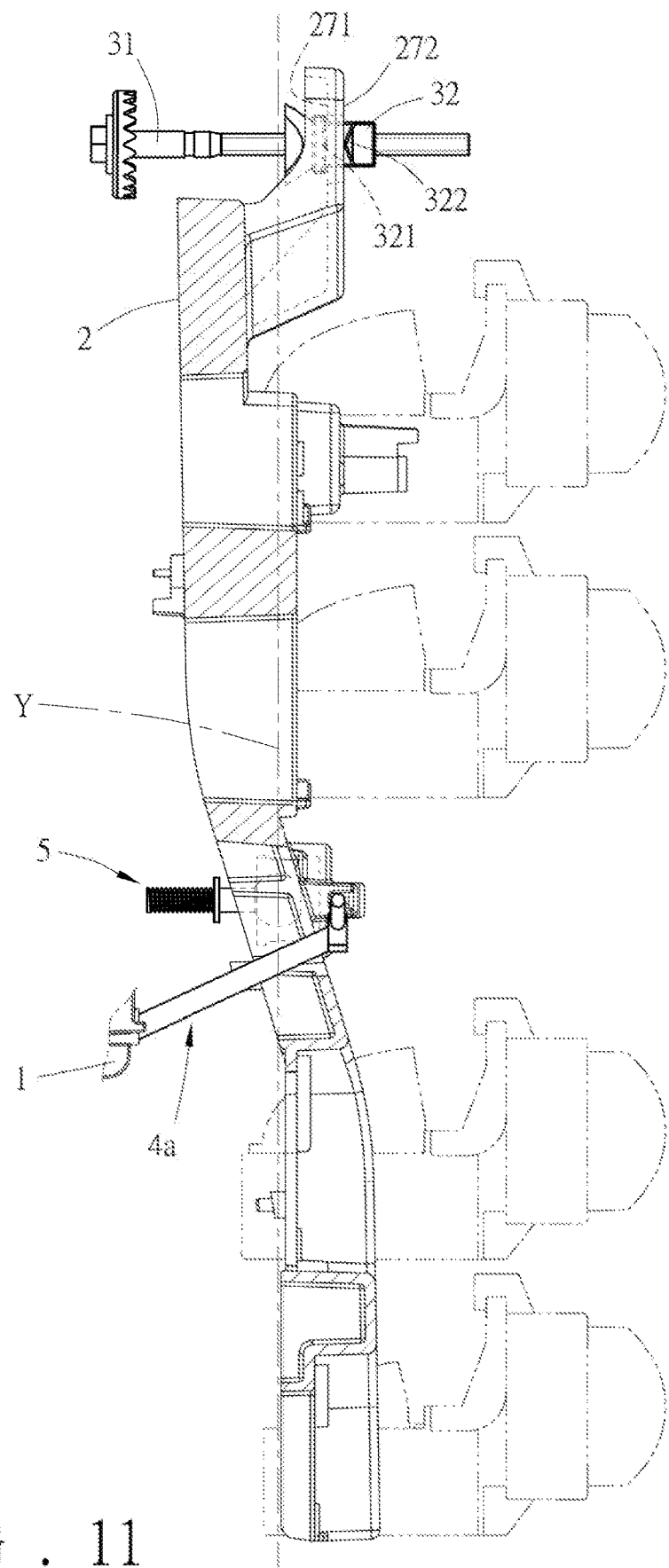
FIG. 11 is a first schematic view showing the operation of the adjustable light fixture according to the first embodiment of the present invention.
Figure 12:
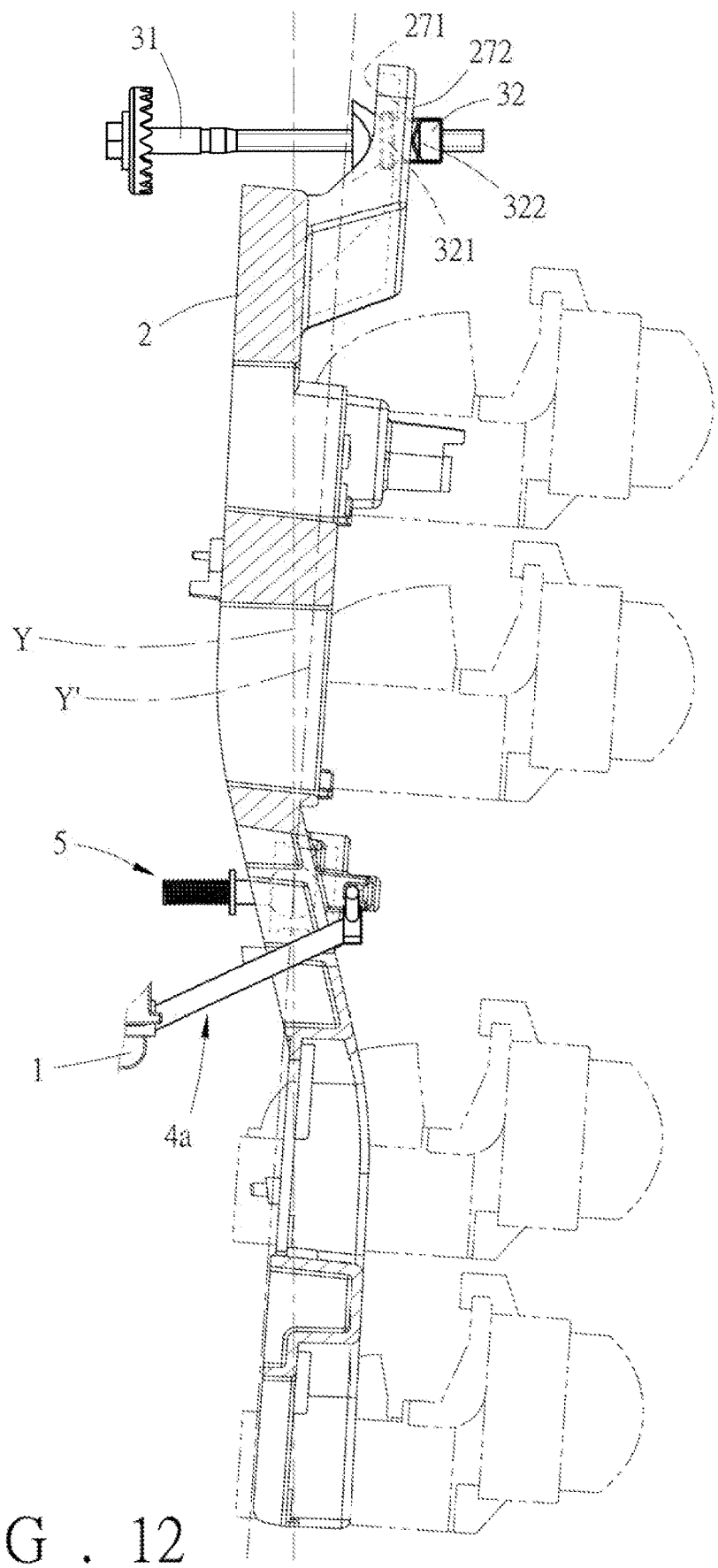
FIG. 12 is a second schematic view showing the operation of the adjustable light fixture according to the first embodiment of the present invention.

Please refer to FIG. 11 and FIG. 12. If the screw rod 31 rotates and drives the nut 32 to move away from the mounting base 1, the first engaging portion 321 will abut against the first contact surface 271 and push the light holder 2 to pivot with the ball joint 5 as a fulcrum. For example, the reference line Y is shifted to the reference line Y', so as to adjust the irradiation angle of the light holder 2. At this time, the anti-falling member 4a will restrain the light holder 2 to prevent it from being loosened or separated from the mounting base 1. If the screw rod 31 rotates reversely and drives the nut 32 to move toward the mounting base 1, the second engaging portion 322 will abut against the second contact surface 271 and push the light holder 2 to pivot with the ball joint 5 as a fulcrum. For example, the reference line Y' is shifted to the reference line Y, so as to adjust the irradiation angle of the light holder 2. At this time, the anti-falling member 4a will restrain the light holder 2 to prevent it from being loosened or separated from the mounting base 1.

Figure 13:
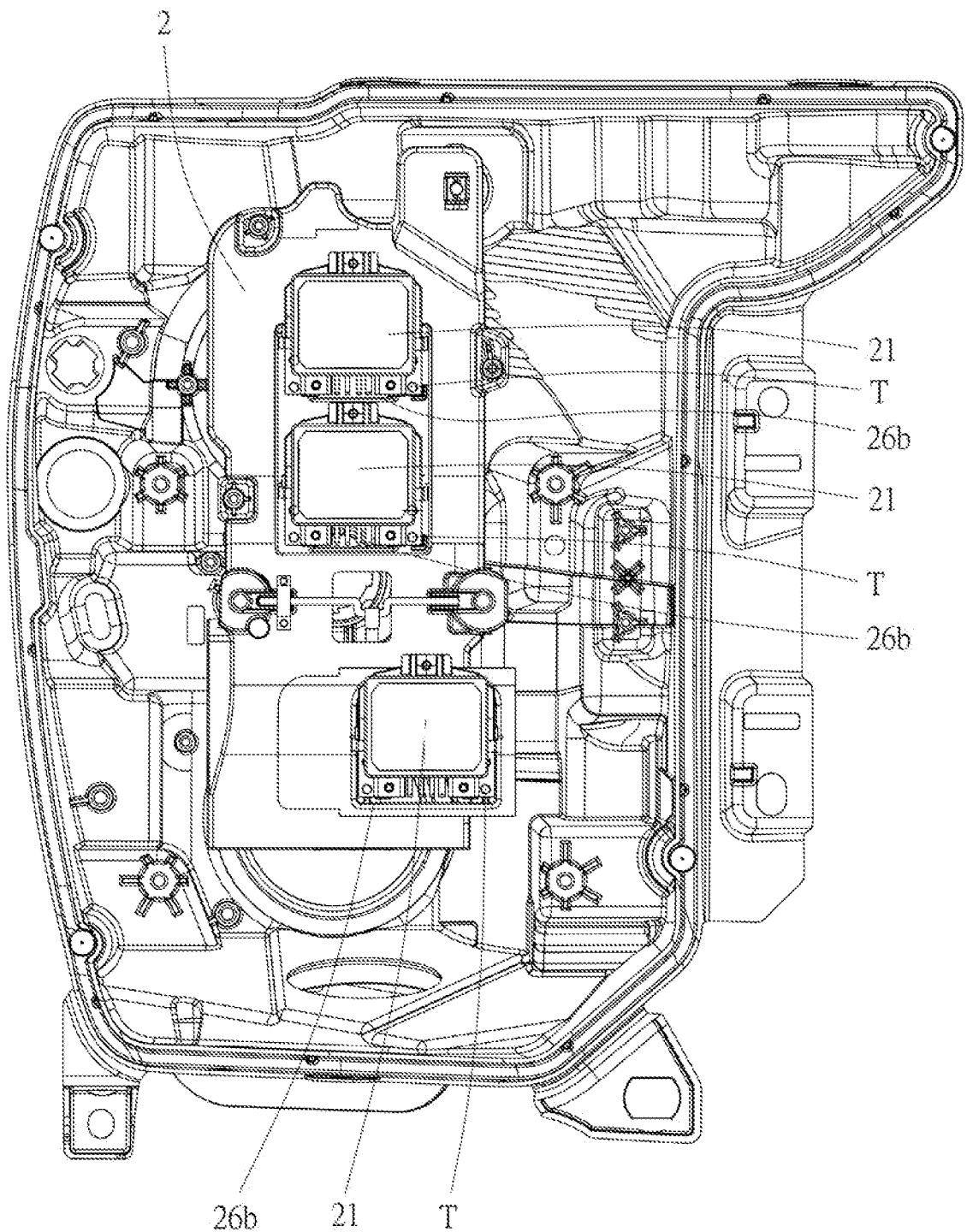
FIG. 13 is a front view of the adjustable light fixture according to a second embodiment of the present invention, wherein the difference between the second embodiment and the first embodiment is that the light-emitting units are arranged in a non-linear manner.

FIG. 13 illustrates a second embodiment of the present invention. The second embodiment is substantially similar to the first embodiment with the exceptions described hereinafter. In this embodiment, the light holder 2 has three light holes 26b. The three light holes 26b are arranged in a non-linear manner. Each light hole 26b is equipped with the light-emitting unit 21. The light-emitting unit 21 is connected to the light hole 26b by a plurality of screws T. In this way, the light-emitting units 21 are mounted to the light holder 2 in a non-linear arrangement according to the usage requirements.

Figure 14:
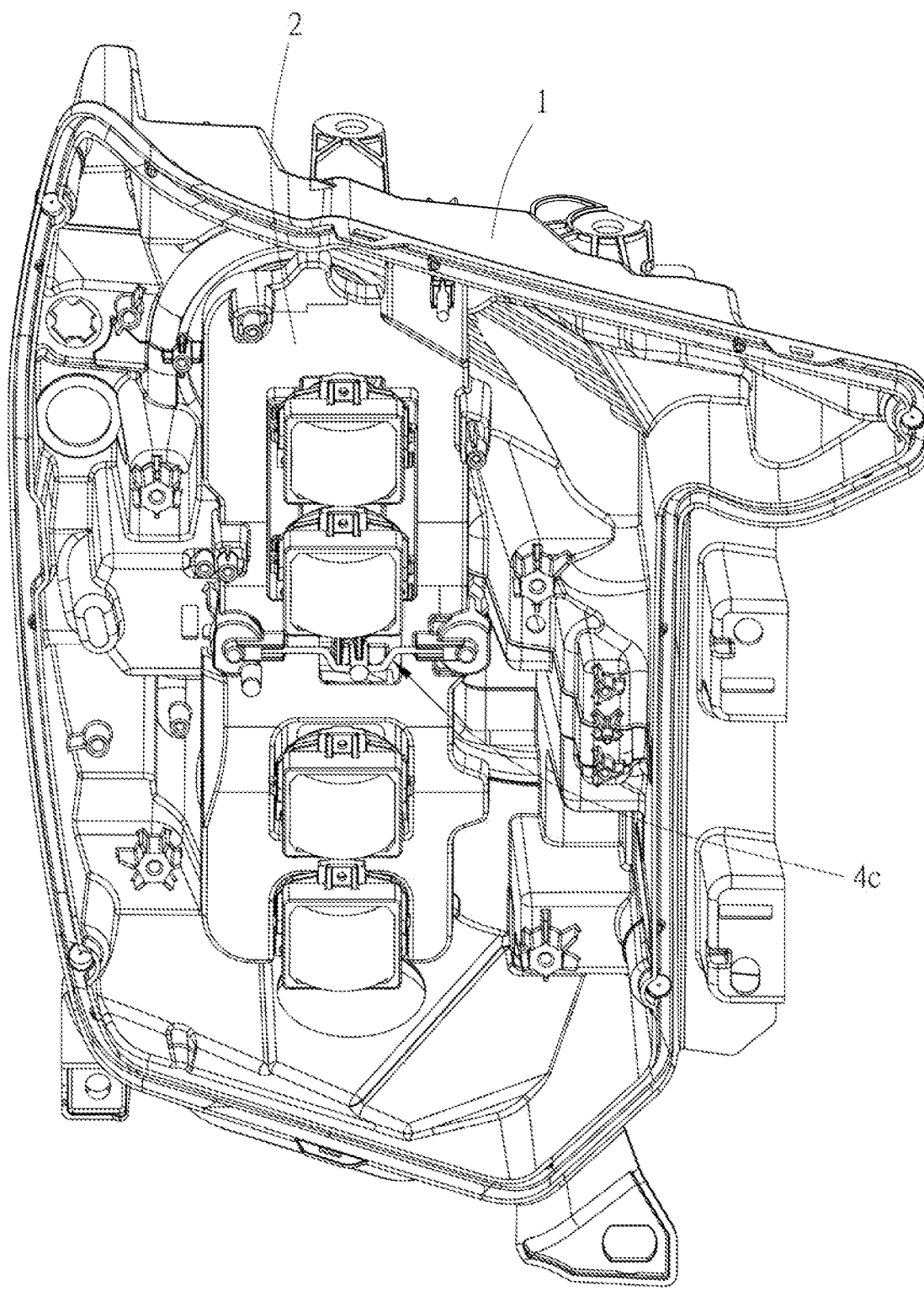
FIG. 14 is a front perspective view of the adjustable light fixture according to a third embodiment of the present invention, wherein the anti-falling member is different from that of the first embodiment.
Figure 15:
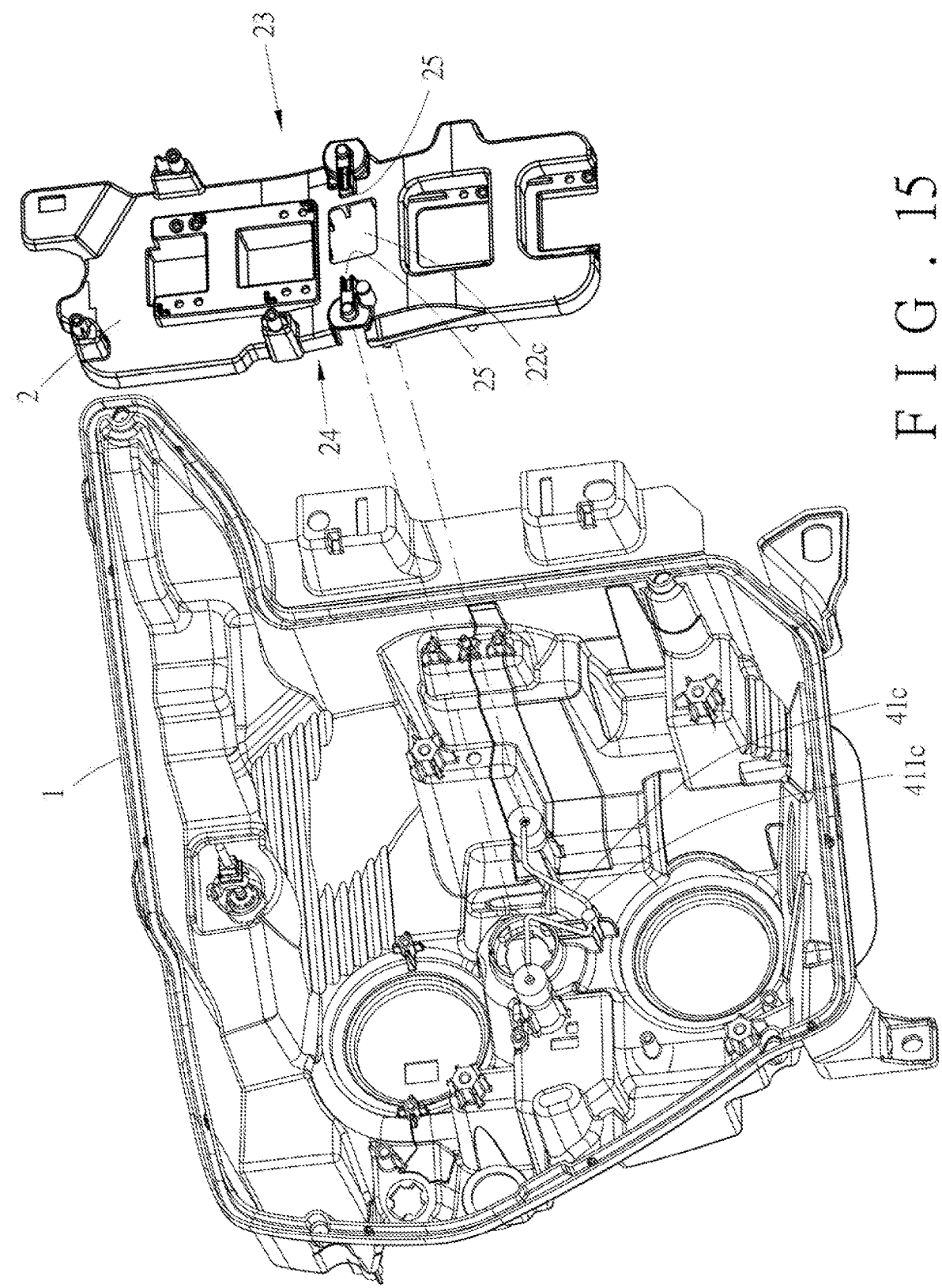
FIG. 15 is an exploded view of the adjustable light fixture according to the third embodiment of the present invention, without the light-emitting units.
Figure 16:
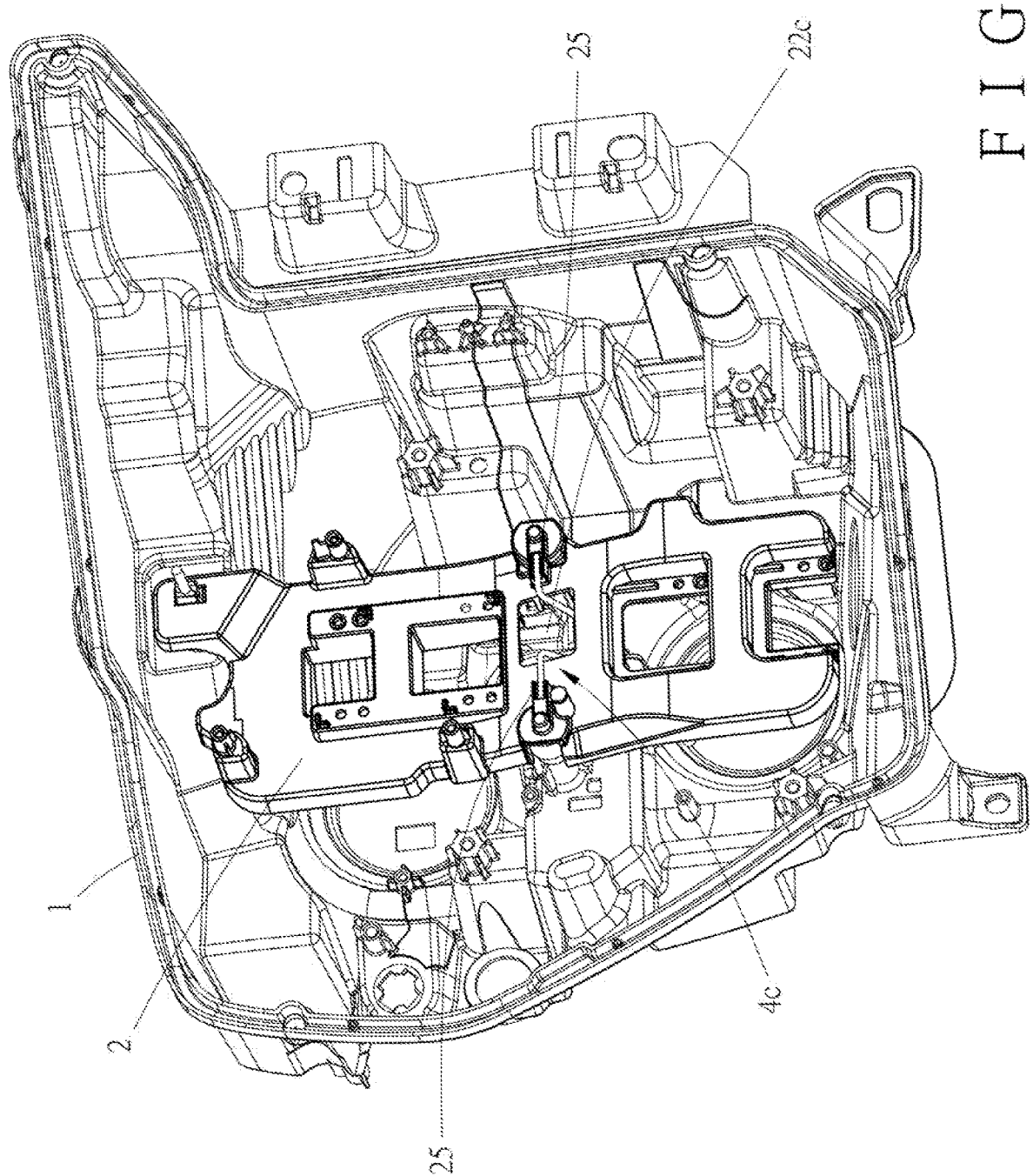
FIG. 16 is an assembled perspective view of FIG. 15.

FIGS. 14-16 illustrate a third embodiment of the present invention. The third embodiment is substantially similar to the first embodiment with the exceptions described hereinafter. In this embodiment, the anti-falling element 4c is also made of an elastic material. The anti-falling member 4c is an elastic rod 41c. Two opposite ends of the elastic rod 41c are movably inserted into two opposite positioning grooves 25 of the light holder 2, respectively. A middle section of the elastic rod 41c has a concave portion 411c. The concave portion 411c passes through the opening 22c from the outer side 23 and is fixed to the mounting base 1 at the inner side 24. Thereby, the anti-falling member 4c is different from that of the first embodiment to provide a different assembling method. Similarly, it is possible to apply a force from the outer side 23 of the light holder 2 to effectively hold the light holder 2 from the outer side 23 to the inner side 24 and prevent the light holder 2 from being detached from the mounting base 1 due to the vehicle running on a bumpy road. In addition, since the light holder 2 is prone to loosening at the position of the pivot portion S, the end of the anti-falling member 4c, connected to the light holder 2, is located at the same height as the pivot portion S, so it can effectively prevent the light holder 2 from being separated from the mounting base 1. The anti-falling member 4c and the pivot portion S are located at the same height, which can reduce the amount of deformation of the anti-falling member 4c when the light holder 2 changes the irradiation angle. The service life of the anti-falling member 4c can be prolonged to keep the anti-falling effect.

Figure 17:
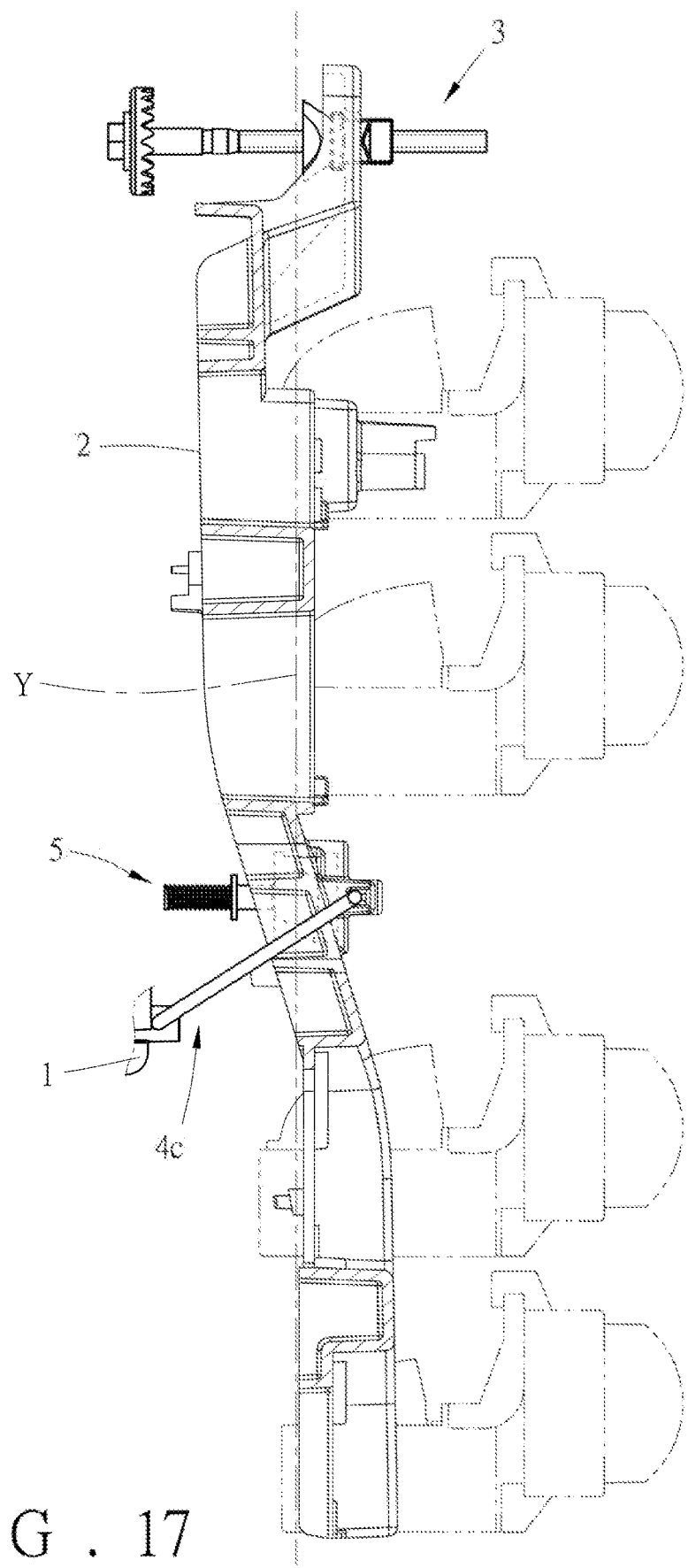
FIG. 17 is a first schematic view showing the operation of the adjustable light fixture according to the third embodiment of the present invention.
Figure 18:
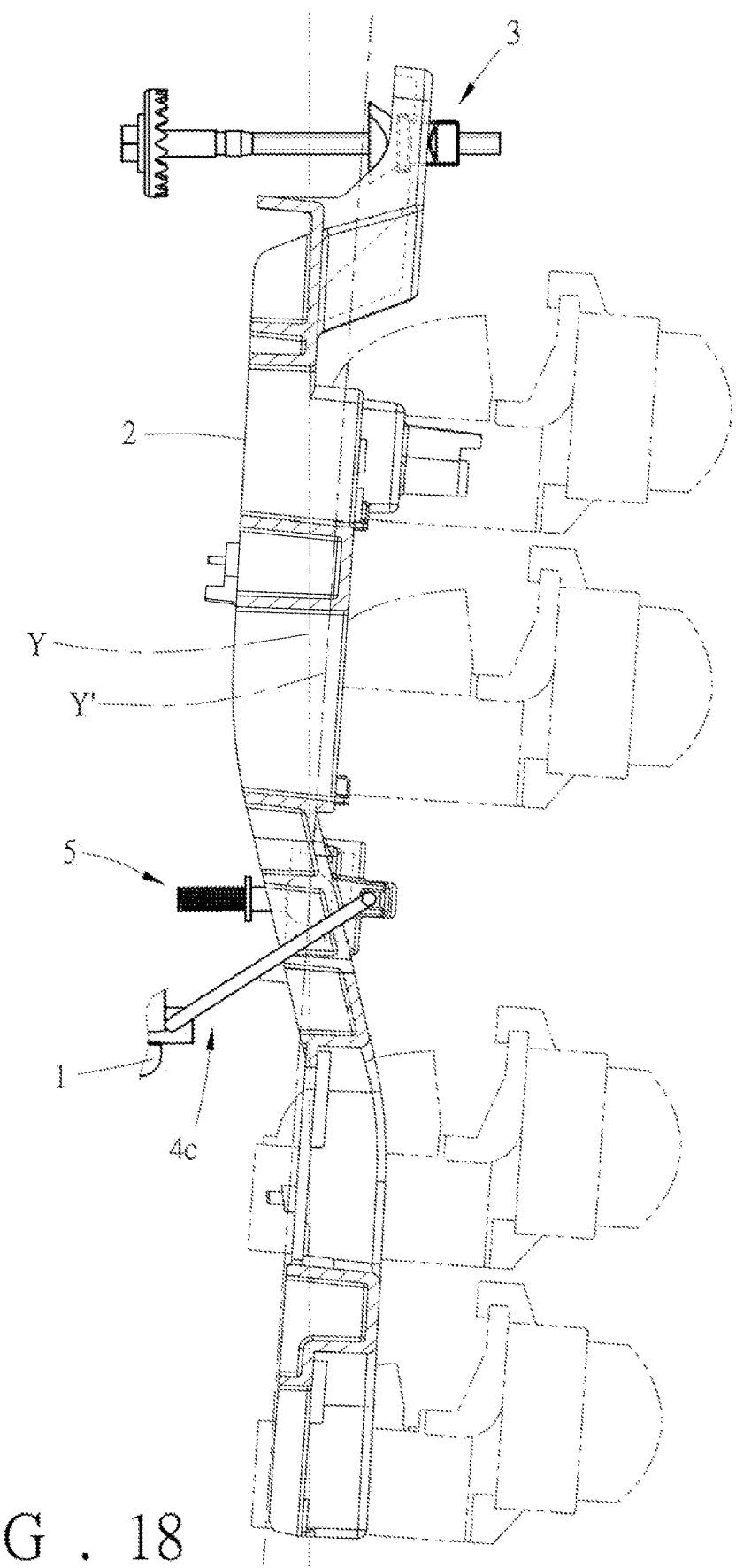
FIG. 18 is a second schematic view showing the operation of the adjustable light fixture according to the third embodiment of the present invention.

Please refer to FIG. 17 and FIG. 18. In the third embodiment of the present invention, the adjustable light fixture is also driven by the adjustment unit 3, so that the light holder 2 is pivotable with the ball joint 5 as the fulcrum. For example, the reference line Y is shifted to the reference line Y' or the reference line Y' is shifted to the reference line Y, so as to adjust the irradiation angle of the light holder 2. At this time, the anti-falling member 4c will restrain the light holder 2 to prevent it from being loosened or separated from the mounting base 1. On the premise that the adjustment unit 3 can drive the light holder 2 to adjust the irradiation angle, the effect of preventing the light holder 2 from being separated from the mounting base 1 is achieved.

Figure 19:
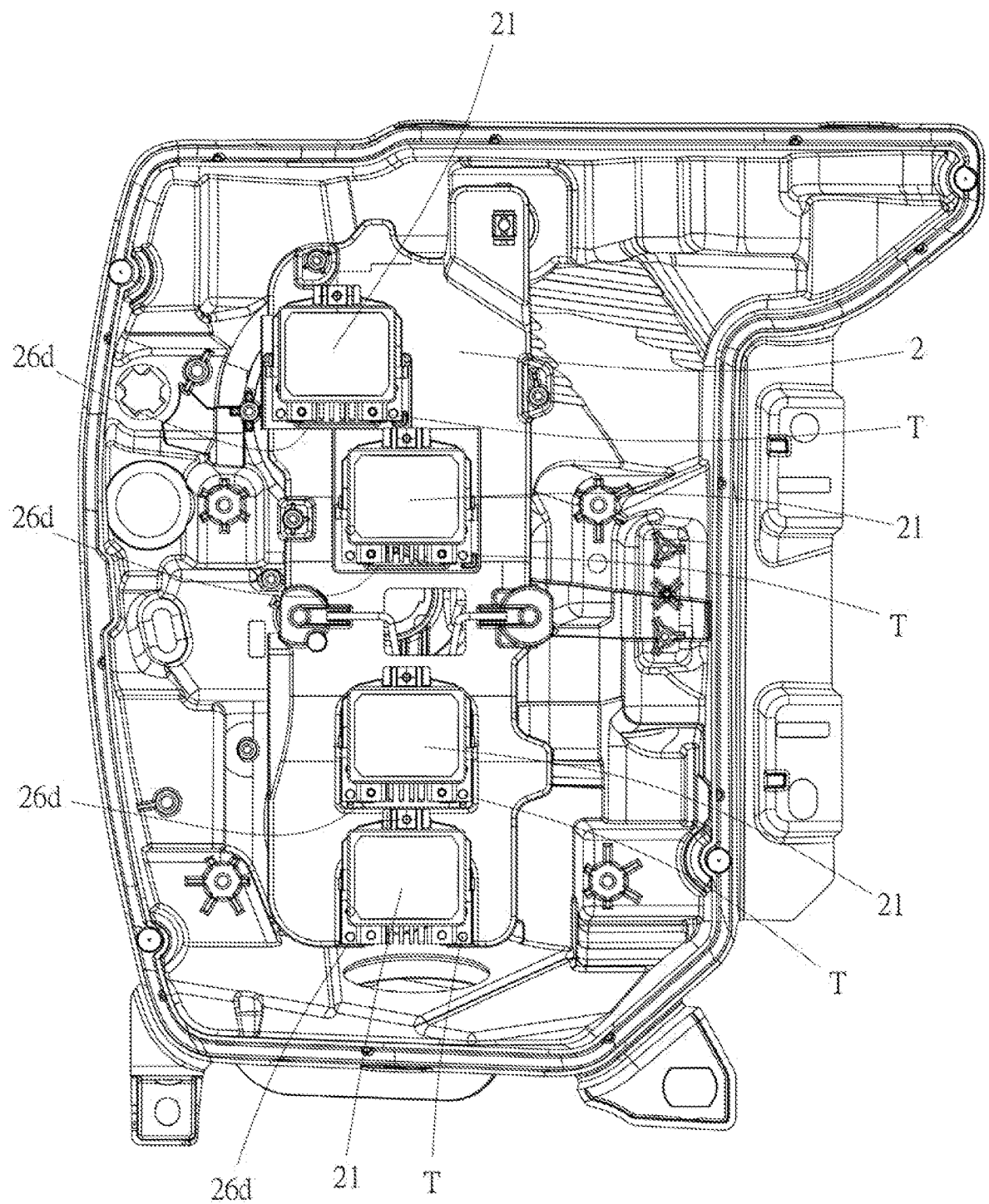
FIG. 19 is a front view of the adjustable light fixture according to a second embodiment of the present invention, wherein the difference between the fourth embodiment and the third embodiment is that the light-emitting units are arranged in a non-linear manner.

FIG. 19 illustrates a fourth embodiment of the present invention. The fourth embodiment is substantially similar to the third embodiment with the exceptions described hereinafter. In this embodiment, the light holder 2 has four light holes 26d. The four light holes 26d are arranged in a non-linear manner. Each light hole 26d is equipped with the light-emitting unit 21. The light-emitting unit 21 is connected to the light hole 26d by a plurality of screws T. In this way, the light-emitting units 21 can be mounted to the light holder 2 in a non-linear arrangement according to the usage requirements.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An adjustable light fixture, comprising:
 a mounting base, having a mounting space;
 a light holder, having a pivot portion and an opening, the opening passing through the light holder, the light holder being pivotally connected to the mounting base through the pivot portion and being located in the mounting space, the light holder being equipped with at least one light-emitting unit;
 an adjustment unit, connected to the light holder, the adjustment unit driving the light holder to pivot relative to the mounting base via the pivot portion;
 an anti-falling member, made of an elastic material, the anti-falling member connecting the mounting base and the light holder, the anti-falling member having a first elastic rod and a second elastic rod, the light holder having an outer side and an inner side, two opposite ends of the first elastic rod being movably inserted into two opposite positioning grooves of the light holder respectively, the two positioning grooves being located at the outer side, one end of the second elastic rod being fixed in a fixing hole of the mounting base, another end of the second elastic rod being fixed to a middle section of the first elastic rod, the middle section of the first elastic rod having a concave portion, the second elastic rod passing through the opening from the inner side and being fixed to the concave portion at the outer side.

2. The adjustable light fixture as claimed in claim 1, wherein the pivot portion of the light holder is pivotally connected to the mounting base through a ball joint, the ball joint has a fixed end and a rotating end, the fixed end is fixed to the mounting base, and the rotating end is disposed on the pivot portion of the light holder.

3. The adjustable light fixture as claimed in claim 1, wherein the adjustment unit includes a screw rod and a nut, one end of the screw rod is rotatably inserted through the mounting base, another end of the screw rod is screwed to the nut, the nut is insertedly connected to an adjustment hole of the light holder, two opposite surfaces of the adjustment hole are defined as a first contact surface and a second contact surface respectively, the nut has a first engaging portion and a second engaging portion, the first engaging portion is engaged with the first contact surface, and the second engaging portion is engaged with the second contact surface.

4. The adjustable light fixture as claimed in claim 1, wherein the light holder has a plurality of light holes, the light holes are arranged in a linear manner, and each of the light holes is equipped with the light-emitting unit.

5. The adjustable light fixture as claimed in claim 1, wherein the light holder has a plurality of light holes, the light holes are arranged in a non-linear manner, and each of the light holes is equipped with the light-emitting unit.

6. The adjustable light fixture as claimed in claim 1, wherein one end of the anti-falling member, connected to the light holder, is located at a same height as the pivot portion.

* * * * *